March 28, 1967 — H. C. HURST — 3,311,236
METHOD AND APPARATUS FOR SCREENING SOLIDS
Filed July 31, 1963
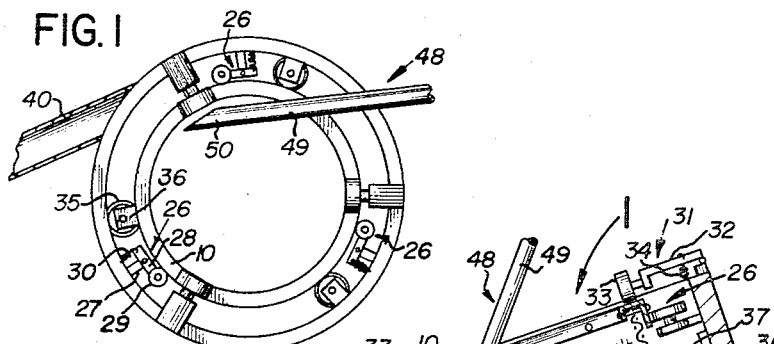
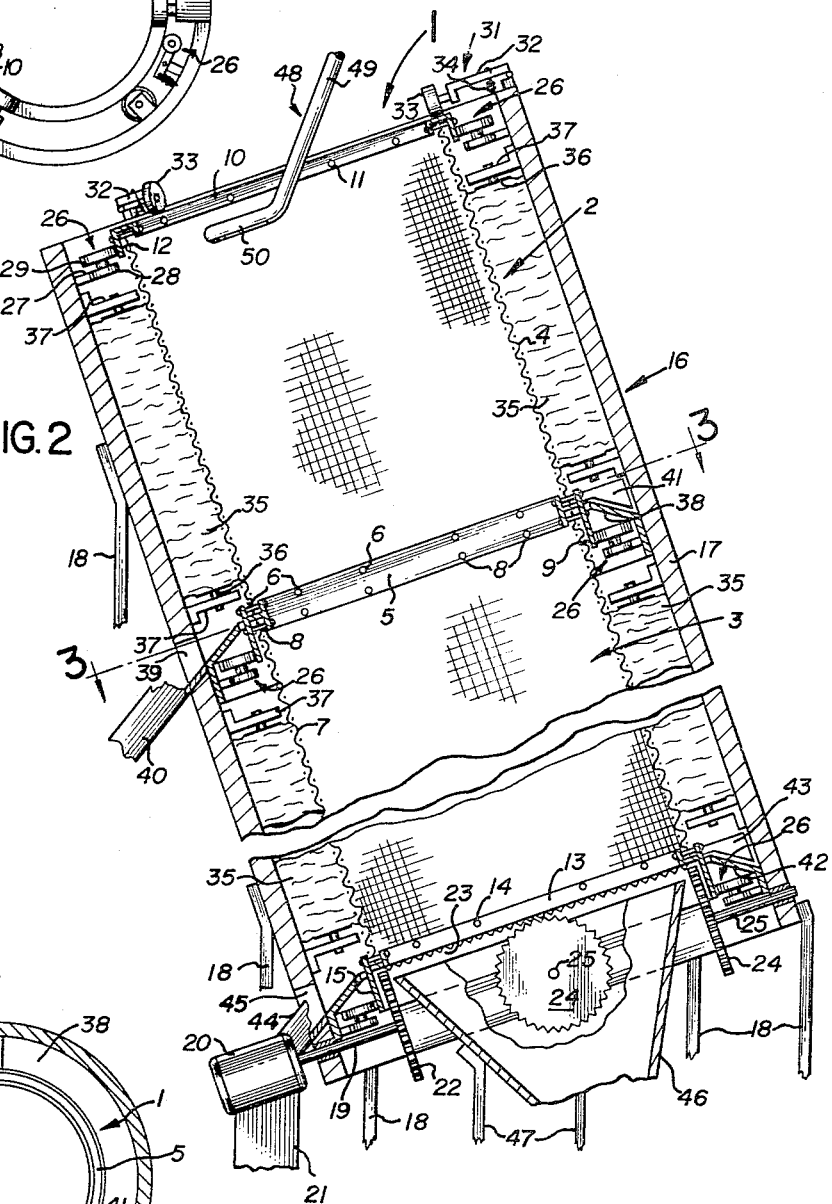
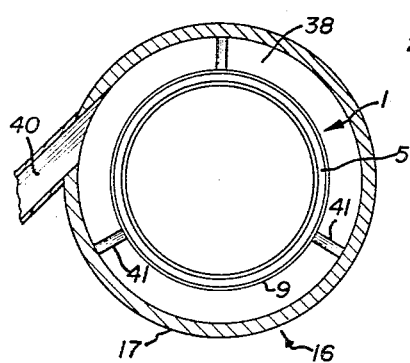
INVENTOR.
Horace C. Hurst
BY
Learman, Learman & McCulloch

United States Patent Office 3,311,236
Patented Mar. 28, 1967

3,311,236
METHOD AND APPARATUS FOR SCREENING SOLIDS
Horace C. Hurst, 321 Malzahn St., Saginaw, Mich. 48602
Filed July 31, 1963, Ser. No. 298,837
19 Claims. (Cl. 209—292)

This invention relates to screening devices and a method for classifying granular material according to its particle size.

The classifying or sorting of grain and other particulate material has been accomplished heretofore largely by vibrating screens and, in some cases, by rotatable screen drums. The utilization of vibrating screens, although successful, has certain objectionable characteristics. For example, vibrating screen machinery is excessively noisy in operation and occupies a great deal of floor space in comparison to the screening surface of the apparatus. In addition, vibration of granular material, particularly when the latter is dusty, may create an excessively dusty and unhealthy atmosphere.

Rotary screen drums of the kind in use heretofore generally have been arranged at a relatively slight inclination to the horizontal and rotated slowly so as to cause material within the drum to tumble along the length of the drum. Such apparatus also is effective for classifying granular material, but it also has objectionable characteristics. For example, the actual area of screen in use at any given time is quite small, but substantial amounts of floor space must be given over to the use of such screens. Moreover, the speed of operation of such drums is extremely slow in comparison to the rate of operation of vibrating screen machinery.

An object of this invention is to provide rotary screening apparatus capable of rapid classification of granular material.

Another object of the invention is to provide screening apparatus which occupies relatively little floor space in comparison with known kinds of classifying apparatus.

A further object of the invention is to provide rotary screening apparatus which permits substantially the entire screen surface to be utilized in the classification of granular material.

A further object of the invention is to provide a method of classifying granular material by subjecting the material to a combination of centrifugal and gravitational forces.

A further object of the invention is to provide a method and apparatus for classifying granular material and which overcome the disadvantages of previously known methods and apparatus.

Other objects and advantages of the invention will be pointed out specifically or will become apparent from the appended claims and the accompanying drawings, in which:

FIGURE 1 is a top plan view of screening apparatus constructed in accordance with the invention;

FIGURE 2 is an enlarged, vertical sectional view of the apparatus;

FIGURE 3 is a sectional view on a reduced scale of the apparatus, the section being taken on the line 3—3 of FIGURE 2.

Apparatus constructed in accordance with the disclosed embodiment of the invention comprises a substantially cylindrical, hollow, foraminous screen assembly 1 composed of one or more tubular screens 2 and 3 arranged in tandem. The screen 2 is open at both of its ends and comprises a perforated annular wall 4 preferably composed of metal mesh and provided with substantially uniform openings over its entire length. At one end of the screen 2 is a reinforcing and attaching band 5 which removably may be secured to the screen wall 4 by studs or bolts 6 and which also removably may be secured to one end of the screen 3 which has an annular wall 7 that is similar to the wall 4 except that the openings of the wall 7 should be larger. The band 5 may be secured to the wall 7 by suitable studs or bolts 8. The band 5 preferably includes a radially outer flange 9 that extends substantially parallel to the wall 7 for a short distance and for a purpose presently to be explained.

The free or upper end of the screen 2 is provided with a reinforcing band 10 that may be secured to the wall 4 by suitable studs or bolts 11, and the band 10 preferably includes a radially outer flange 12 that extends substantially parallel to the wall 4 for a limited distance. The free or lower end of the screen 3 is provided with a reinforcing band 13 that is secured to the wall 7 by suitable studs or the like 14, the band 13 also having a radially outer flange 15 which extends beyond the free end of the wall 7 in prolongation of the latter.

The screens 2 and 3 are joined to one another so that their longitudinal axes are coincident, and the screen assembly is adapted to be rotated about its longitudinal axis at an inclination to the vertical. Means for mounting the screen assembly comprises an annular housing or drum 16 having an annular wall 17 that is open at both of its ends and which is supported from a floor or other base by suitable braces 18 which may be bolted or otherwise suitably secured to the wall 17. The inclination of the drum 16 will determine the inclination of the screen assembly 1. The inclination of the apparatus should be less than 45° from the vertical and, preferably, is between 15° and 30° from the vertical. If desired, suitable means of any conventional kind may be provided for adjusting the lengths of the braces 18, thereby enabling the inclination of the apparatus to be adjusted.

Adjacent the lower end of the member 16 a shaft 19 is journaled in the wall 17. The shaft 19 is adapted to be rotated by an electric or other motor 20 which may be supported on a suitable stand 21. Fixed to the shaft 19 is a gear 22 having teeth which mesh with gear teeth 23 formed on the lower surface of the reinforcing band 13. At spaced intervals about the periphery of the annular wall 17 are idler gears 24 in mesh with the gear teeth 23 and fixed on spindles 25 which are journaled in the annular wall 17. The gears 22–24 not only assist in mounting the screen assembly within the drum 16, but provide means for rotating the screen assembly relatively to the drum.

The screen assembly is maintained coaxial with the drum 16 by a plurality of similar positioning devices 26 which act on the flanges 9, 12, and 15 of the screen assembly. Each positioning device 26 comprises a mounting bracket 27 that is fixed to the inner surface of the drum wall 17 and on which is pivoted an arm 28. At one end of the arm 28 is journaled a roller 29 and at the other end of the arm 28 is anchored one end of a tension spring 30, the opposite end of which is anchored to the wall 17. The construction and arrangement of each positioning device 26 is such that its spring 30 constantly urges the arm 28 to rock in such direction as to cause the roller 29 to bear against the associated flange of the screen assembly, thereby maintaining the latter coaxial with the drum 16, but spaced radially inwardly from the wall 17.

Stabilizing means 31 is provided to maintain the gear 23 in mesh with the gears 22 and 24 and comprises a plurality of arms 32 that are hinged at the upper end of the drum wall 17 and project radially inwardly toward the screen assembly. At the radially inner end of each arm 32 is journaled a roller 33 which overlies and bears against the upper edge of the band 10. The rollers 33 are urged constantly into forcible engagement with the band 10 by means of tension springs 34, one end of each of which is anchored to the arm 32 and the other end of which is anchored to the drum wall 17. The hinged or pivotal mounting of the positioning members 26 and the stabilizing devices 31 permit substitution of screen assemblies if it is desired to replace one screen assembly with another having different size openings in the screens.

At intervals about the periphery of each screen 2 and 3 is a screen cleaning roller or brush 35 that is mounted in the space between the associated screen and the drum wall 17. Each roller comprises a body formed of soft or sponge rubber, or similar material, the body being secured to a spindle 36 that is journaled at its opposite ends in brackets 37 that are fixed to the inner surface of the wall 17. The periphery of each roller 35 engages the walls of the respective screens and maintains the openings of the latter unobstructed. In some instances, the rollers may be utilized to support a screen, in conjunction with fewer positioning members 26 than are disclosed in the drawing.

Secured to the inner surface of the drum wall 17 adjacent the lower end of the screen 2 is an annular grain collecting shelf 38 that surrounds the screen and occupies the space between the flange 9 and the wall 17. The shelf 38 is continuous and is inclined downwardly in a radially outward direction. A discharge opening 39 formed in the drum wall 17 communicates with the space between the latter and the screen 2 and accommodates a grain conveying or gathering trough 40 that is secured to the wall 17 and extends from the latter substantially tangentially of the shelf 38.

Means for sweeping particles from the shelf 38 into the gathering trough 40 comprises a plurality of radially extending sweeps or arms 41 that are secured to the flange 9 and overlie the shelf 38. The arrangement is such that relative rotation of the screen assembly and the drum 16 will cause the arms 41 to sweep the material on the shelf 38 toward the trough 40 to which such material will be discharged for delivery to a suitable receptacle.

Adjacent the lower end of the screen member 3 is a shelf 42 that is similar to the shelf 38 and from which material may be swept by arms 43 similar to the arms 41 and secured to the flange 15. A gathering trough 44 communicates with the shelf 42 and extends substantially tangentially of the latter through an opening 45 formed in the drum wall 17.

Beneath the open end of the lower screen 3 may be provided a gathering funnel or the like 46 to receive material discharged from within the screen assembly and deliver it to a suitable receptacle. The member 46 may be supported by braces 47 that are welded or otherwise fixed to the member 46.

Means 48 is provided for introducing particulate material into the screen assembly adjacent the open upper end of the latter. The delivery means may comprise a hollow tube 49 extending downwardly from a storage member (not shown) and projecting into the screen assembly. The tube 49 terminates in a discharge end 50 which preferably is inclined so as to extend substantially normal to the longitudinal axis of the screen assembly. The discharge end of the tube 49 is located adjacent the inner surface of the upper screen so that material discharged from the tube impinges directly on the wall of the screen.

In the preferred embodiment, material is discharged from the terminal end of the delivery tube 49 at a linear speed corresponding substantially to the peripheral speed of the screen wall and in the direction of rotation of the latter. Thus, the screen assembly disclosed in FIGURES 1 and 2 of the drawings is to be driven in a counterclockwise direction.

Apparatus constructed in accordance with the invention is adapted for use in conjunction with various kinds of grain, gravel, seeds, and other particulate materials wherein the particles vary in size. The apparatus is adapted to have a particular granular material introduced into the upper screen adjacent the upper end of the latter during rotation of the screen assembly. The speed of rotation of the screen assembly should be such as to impose a centrifugal force on the particles of the material of such magnitude as to cause them to be urged radially outwardly and bear against the wall of the screen assembly and simultaneously be urged downwardly by the force of gravity so as to traverse the full length of the screen wall as they are rotated about the axis of rotation of the screen assembly.

As the material descends through the screen assembly, particles which are of such size as to pass through the openings in the upper screen wall will be urged by centrifugal force through such openings, whereas larger particles will be retained within the screen assembly and will progress downwardly to the screen 3. If the openings in the wall of the screen 3 are larger than the openings in the upper screen, somewhat larger particles will be passed through the wall of the screen 3. Particles which are too large to pass through the screen 3 will be discharged from the lower end of the lowermost screen into the gathering member 46.

Particles which are discharged through the upper screen 2 will be collected on the shelf 38 from which they will be swept by the rotating arms 41 into the gathering trough 40. Particles which pass through the wall of the lower screen 3 will be collected on the shelf 42 from which they will be swept by the arms 43 into the gathering trough 44.

The speed at which the screen assembly is rotated to produce the desired results for a given inclination of the screen assembly and for a given material can be determined empirically by visual observation of the action of the particles of the material within the screen assembly. It is therefore desirable that the driving motor 20 be one which is capable of driving the screen assembly at any one of a plurality of speeds.

It is well known that the centrifugal force imposed on a particle is directly proportional to the radius of rotation, the speed of rotation, and the mass of the particle. Accordingly, the approximate speed of rotation of the screen assembly can be calculated in advance by utilization of the centrifugal force formula. Tests have indicated that satisfactory results in grain classification can be achieved when the screen assembly is inclined to the vertical at approximately 15° and at approximately 30°, and at various positions therebetween. The tilting of the screen is necessary to avoid rapid vertical falling of the particles, and the angle of tilting will depend on the factors affecting centrifugal forces referred to above.

The screen assembly should rotate at a speed sufficient to impose a centrifugal force of about 1 G on the particles of grain, G representing the constant of acceleration imparted to a mass of gravity. In such operation, the grain will be carried by the screen about the axis of rotation of the latter and particles not passed through openings in the screen will slide down the inner surface of the latter and describe a helical path toward the lower end of the screen.

The operation of the apparatus may be continuous, is smooth and quiet, and does not create substantial dust. Moreover, several devices constructed according to the invention can be installed in the floor space formerly occupied by vibrating screen structures or substantially horizontal mills, thereby providing greater classifying capacity for the same amount of floor space.

Among other advantages of the invention not specifically referred to above are the simplified feeding or delivery means and the simplification of maintaining the screens clean or unplugged. In contrast to the rather complex devices for feeding material evenly to a flat, vibrating screen, the delivery of material to the rotating screen of the invention is achieved by a single tube of the kind ordinarily associated with bulk flow of grains. In comparison to the reciprocating brush or scrapers associated with vibrating screens to prevent their becoming plugged, the instant apparatus makes use of simple rollers, each of which traverses the periphery of the screen once for each revolution of the screen, and without requiring any driving mechanism for the roller.

This disclosure is representative of presently preferred methods and apparatus, but is intended to be illustrative rather than definitive thereof. The invention is defined in the claims.

I claim:

1. Screening apparatus comprising a generally cylindrical, foraminous screen member having a smooth, cylindrical inner surface and provided with substantially uniform openings therein; means mounting said screen member for rotation about an axis that is inclined to the vertical not more than 45°; means for introducing particulate material onto the inner surface of said screen member adjacent its upper end, at least some of the particles of said material being of such size as to pass through said openings; means for rotating said screen member, said rotating means being of such capacity as to rotate said screen member at a speed to impose on the particles of said material a centrifugal force having a magnitude of about 1 G but having insufficient magnitude to prevent movement of said particles downwardly from the upper end of said screen member by gravity; and tubular means encircling said screen member and supported externally of said member for gathering particles passed through the openings in said member.

2. Screening apparatus comprising a generally cylindrical, foraminous member having a smooth, cylindrical inner surface and provided with substantially uniform openings therein; means mounting said screen member for rotation about an axis that is inclined to the vertical not more than 45°; means for introducing particulate material onto the inner surface of said screen member adjacent its upper end, at least some of the particles of said material being of such size as to pass through said openings; means for rotating said screen member at such speed as to impose on the particles of said material a centrifugal force having a magnitude of about 1 G but having insufficient magnitude to prevent movement of said particles downwardly from the upper end of said member by gravity; tubular means encircling said screen member externally of the latter for receiving particles passed through the openings in said screen member; annular means interposed between said tubular means and said screen member for collecting said passed particles; and means carried by said screen member for rotation therewith and projecting substantially radially thereof for removing particles from said annular means.

3. Screening apparatus comprising a generally cylindrical, foraminous member having substantially uniform openings therein; means mounting said member for rotation about an axis that is inclined to the vertical not more than 45°; means for introducing particulate material onto said member adjacent its upper end, at least some of the particles of said material being of such size as to pass through said openings; means for rotating said member; a stationary, cylindrical drum member surrounding said foraminous member and radially spaced from the latter; an annular shelf supported by one of said members and substantially occupying the radial space between said members for receiving particles passed through said foraminous member; and particle sweeping means fixed to the other of said members adjacent said shelf for sweeping particles off said shelf in response to rotation of said foraminous member.

4. The apparatus set forth in claim 3 including conveying means supported by said drum member and communicating substantially tangentially with said shelf for receiving particles swept from said shelf by said engaging means.

5. The apparatus set forth in claim 3 wherein said shelf is supported on said drum member and said engaging means is fixed to said foraminous member.

6. The apparatus set forth in claim 3 including rotatable brush means supported by said drum member and interposed between the latter and said foraminous member.

7. A method of classifying particulate material comprising introducing said material onto the inner surface of and adjacent one end of a cylindrical screen having openings therein of such size as to pass particles corresponding substantially to and smaller than the size of said openings; and rotating said screen about an axis inclined less than 45° to the vertical and causing said material to traverse said screen in a helical path about said axis.

8. The method set forth in claim 7 wherein said material is introduced into said screen substantially tangentially of the inner surface thereof.

9. The method set forth in claim 8 wherein said material is introduced into said screen at a linear velocity corresponding substantially to the peripheral speed of rotation of said screen.

10. Apparatus for classifying particulate material, said apparatus comprising at least one cylindrical screen having a smooth inner surface and having substantially uniform size openings therein, said screen being open at both of its ends; means mounting said screen for rotation about an axis that is inclined between 15° and 30° to the vertical; means communicating with the upper end of said screen for introducing said material onto the upper surface of said screen substantially tangentially of the inner surface thereof; means for rotating said screen about said axis, said rotating means having a capacity to rotate said screen at such speed as to cause material therein to be urged radially outwardly by centrifugal force and simultaneously urged downwardly by gravity, whereby said material may traverse said screen in a helical path about said axis so that particles having a size smaller than or substantially corresponding to the size of said openings may pass through said screen and particles larger in size than the size of said openings may be discharged through the open lower end of said screen; and tubular collecting means encircling said screen externally of the latter for collecting particles passed therethrough.

11. The apparatus set forth in claim 10 wherein said material means for introducing material into said screen accelerates said material to a linear velocity corresponding substantially to the peripheral speed of said screen.

12. The apparatus set forth in claim 10 including a plurality of screens arranged in tandem and joined to one another, said screens having openings therein that increase in size in a downward direction.

13. Screening apparatus comprising a generally cylindrical screen member having a smooth inner surface and having openings of predetermined size therein; means mounting said screen member for rotation about an axis inclined to the vertical; means for introducing onto the inner surface of said screen member adjacent its upper end particulate material at least some of which is of such size as to pass through said openings; means for rotating said screen member about said axis at such speed with relation to the particle weight of said material as to cause said material to traverse the inner surface of said screen member in a helical path about said axis whereby the material of such size as to pass through said openings may do so; a tubular member enclosing said screen member for receiving material passed through said openings; and collecting means in communication with said screen member and with said tubular member respectively for collecting the material retained within said member and the material passed through said openings.

14. The apparatus set forth in claim 13 wherein the means for rotating said screen member is of such capacity as to rotate said screen member at a speed sufficient to impose on material therein a centrifugal force having a magnitude of at least 1 G.

15. The apparatus set forth in claim 13 wherein the means for introducing material to the upper end of said screen member has a discharge end adjacent the inner surface of said screen member and substantially tangential thereto.

16. The apparatus set forth in claim 13 wherein the collecting means for material passed through said openings comprises annular means interposed between said members and means in communication with said annular means for receiving material therefrom.

17. The apparatus set forth in claim 13 wherein said annular means is fixed to one of said members.

18. The apparatus set forth in claim 17 wherein said annular means is fixed to said tubular member.

19. The apparatus set forth in claim 18 including sweep means fixed to said screen member in sweeping relation with said annular means.

References Cited by the Examiner

UNITED STATES PATENTS

| 783,724 | 2/1905 | Harrison et al. | 209—298 X |
| 2,806,600 | 9/1957 | Bryan et al. | 209—297 X |

FOREIGN PATENTS

| 606,913 | 10/1960 | Canada. |
| 96,645 | 4/1898 | Germany. |

FRANK W. LUTTER, *Primary Examiner.*

L. H. EATHERTON, *Assistant Examiner.*